United States Patent [19]

Clark

[11] Patent Number: 4,518,960
[45] Date of Patent: May 21, 1985

[54] SPEED INDEPENDENT SELECTOR SWITCH EMPLOYING M-OUT-OF-N CODES

[75] Inventor: Becky J. Clark, Del Mar, Calif.

[73] Assignee: Burroughs Corporation, Detroit, Mich.

[21] Appl. No.: 444,063

[22] Filed: Nov. 23, 1982

[51] Int. Cl.³ .......................... H04Q 9/00; H04J 6/00
[52] U.S. Cl. ............... 340/825.02; 307/244; 340/825.03; 370/60
[58] Field of Search ............ 340/825.02, 825.03; 370/59, 60, 112, 91; 307/244

[56] References Cited

U.S. PATENT DOCUMENTS 4,201,891  5/1980  Lawrence et al. ............ 370/91
4,262,387  4/1981  Shima ........................ 370/60
4,404,556  9/1983  Messina et al. ............. 340/825.03
4,481,623  11/1984  Clark ....................... 340/825.02

Primary Examiner—Donald J. Yusko
Attorney, Agent, or Firm—Charles J. Fassbender; Kevin R. Peterson

[57] ABSTRACT

A selector is comprised of one input port and two output ports; the input port has N input data lines and each of the output ports has N output data lines; one circuit in the selector selects only one of the two output ports at a time; and another circuit in the selector passes characters from the input port to the selected output port. Each of the characters is represented by active logic signals on M-out-of-N data lines on the input port, with M being at least two and N being greater than M and greater than three.

10 Claims, 7 Drawing Figures

SPEED INDEPENDENT SELECTOR SWITCH EMPLOYING M-OUT-OF-N CODES

BACKGROUND OF THE INVENTION

This invention relates to arbiters and selectors, and networks of the same.

In general, an arbiter is a logic circuit having two input ports and one output port; and in operation, messages are passed from either input port to the output port. One prior art arbiter is described, for example, in the U.S. Pat. No. 4,251,879 issued Feb. 17, 1981 to Becky J. Clark, who is also the inventor in the present application.

Also in general, a selector is a logic circuit having one input port and two output ports, and in operation, messages are passed from the one input port to a selectable one of the two output ports. One prior art selector is described, for example, in U.S. Pat. No. 4,237,447 issued Dec. 2, 1980 to the same Becky J. Clark.

Now a limitation which the above-cited arbiters and selectors have is that they only operate on bit serial messages. That is, the messages which pass from their input port to their output ports do so only one bit at a time. Thus, the maximum baud rate at which those arbiters and selectors operate is relatively low.

To increase that baud rate, one might try arranging a number of the above-cited arbiters and selectors in parallel. But a problem with such a parallel arrangement is that multiple bits would not pass through the parallel paths in synchronization with each other. This is because the arbiters choose one of their input paths or the other in a random fashion when requests arrive on both input ports simultaneously. Thus, multiple bits sent from one source through a parallel arrangement of the above-cited arbiters and selectors would reach their destination in an unpredictable and highly scrambled fashion.

Accordingly, a primary object of the present invention is to provide an improved selector.

Another object of the invention is to provide a selector which passes multiple bits in parallel from its input port to its output ports.

BRIEF SUMMARY OF THE INVENTION

These and other objects are accomplished in accordance with the invention by a selector having one input port and two output ports. The one input port has N input data lines and each output port has N output data lines. One circuit is included for selecting only one of the output ports at a time; and another circuit is included for passing characters from the one input port to the selected output port. Each character that is passed from the one input port to the selected output port is represented by active logic signals on M-out-of-N data lines on the input port, with M being at least two and N being greater than M and greater than three.

BRIEF DESCRIPTION OF THE DRAWINGS

Various features and advantages of the invention will best be understood by reference to the following detailed description and accompanying drawings wherein.

DETAILED DESCRIPTION OF THE INVENTION

Figure 1:
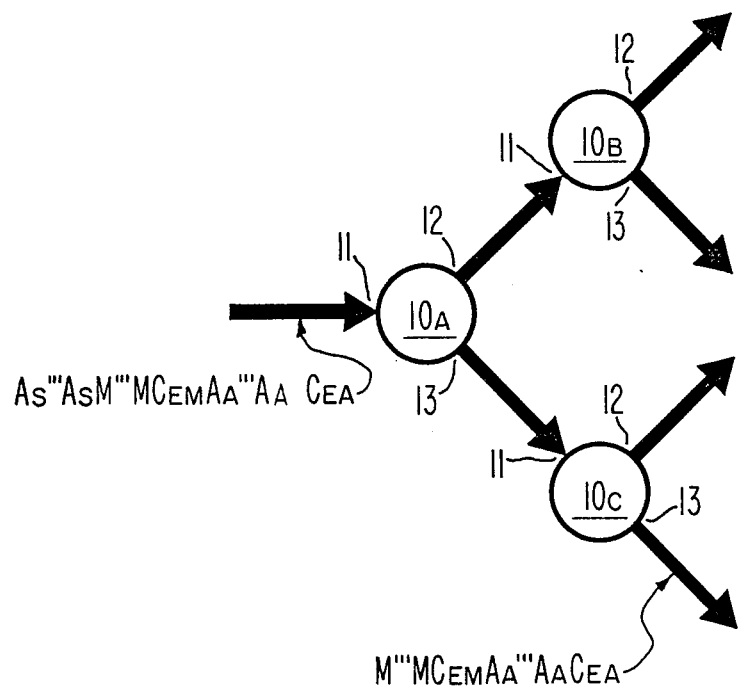
FIG. 1 illustrates a network of selectors that are constructed in accordance with the invention.

One preferred embodiment of the invention will now be described in detail in conjunction with FIGS. 1 through 7. To begin, FIG. 1 illustrates an example of how three selectors 10A, 10B, and 10C, each of which is constructed according to the invention, can be interconnected as a system. Of course, any other number of selectors and arbiters can also be interconnected in an input-port-to-output-port fashion to form other systems as well.

Selectors 10A, 10B, and 10C are identical to each other; and the letters A, B, and C are appended only to identify the position of those selectors in the system. Each selector includes one input port and two output ports. In FIG. 1, reference numeral 11 indicates the input port while reference numerals 12 and 13 indicate respective output ports.

In the system of FIG. 1, the input ports of selectors 10B and 10C are connected to respective output ports of selector 10A. And in operation, message are sent from the input port of selector 10A to any of the output ports of selectors 10B and 10C. Each messages as it is put into the selector system has the format $A_S \ldots A_S M \ldots M C_{EM} A_A \ldots A_A C_{EA}$; and each message after it has passed to the output ports of selectors 10B and 10C has the format $A_S \ldots A_S M \ldots M C_{EM} A_A \ldots A_A C_{EA}$.

In the above-described message formats, each of the other symbols $A_S$, M, $C_{EM}$, $C_{EA}$, and $A_A$ stands for one character. And that character is represented by an M-out-of-N code. That is, each of the input ports 11 and output ports 12 and 13 in the selectors includes N data lines; and characters on those data lines are represented by signals on M-out-of-N of the lines being in an active state.

Also in the above message formats, the symbol M represents a character in the body of the message; whereas the symbols $A_S$, $C_{EM}$, $C_{EA}$, and $A_A$ represent control characters. Control characters $A_S \ldots A_S$ are utilized by the selector network to choose a path through the network. Specifically, the first $A_S$ character selects one of the output ports of selector 10A; the second $A_S$ character selects one output port of the next selector; etc. The $A_S$ characters are two particular characters of the set of possible characters for M.

Control character $C_{EM}$ is utilized by an arbiter network (not shown) to indicate an end of a message body. One control character $A_A$ is generated by each arbiter to indicate which of its input ports the message passed through. The $A_A$ control characters are the same two characters as the $A_S$ control characters. And control character $C_{EA}$ is utilized by the selectors to indicate the end of an $A_A$ character string and of the message.

Figure 2:
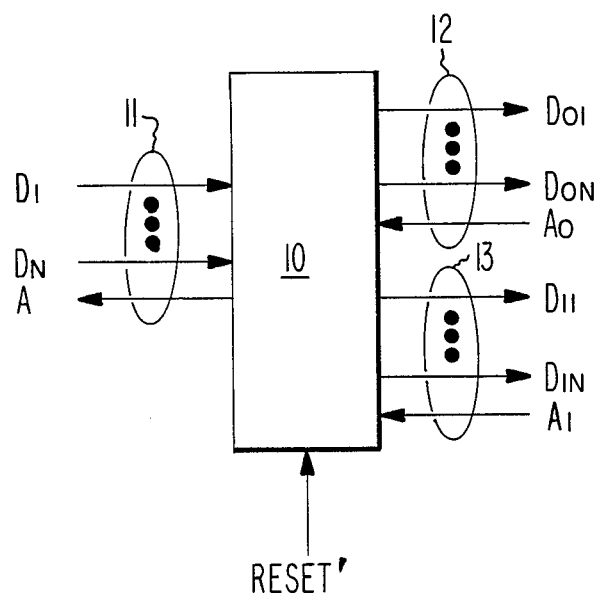
FIG. 2 illustrates a block diagram of one of the selectors in the network of FIG. 1.

Turning now to FIG. 2, a block diagram of one of the selectors is there illustrated. In this block diagram, signals $D_1 \ldots D_N$ represent data signals on the output data lines of input ports 11; signals $D_{01} \ldots D_{0N}$ indicate data signals on respective output data lines of output port 12; and signals $D_{11} \ldots D_{1N}$ indicate data signals on respective output data lines of output port 13.

Input port 11 also includes one input control line; and each output port also includes one output control line. Signal A is generated by the selector on the input control line for input port 11; signal $A_0$ is received by the selector on the output control line for output port 12;

and signal $A_1$ is received by the selector on the output control line for output port 13. In general, these signals are utilized to coordinate the transfer of characters from the data lines of an output port to the data lines of an input port.

Figure 4:
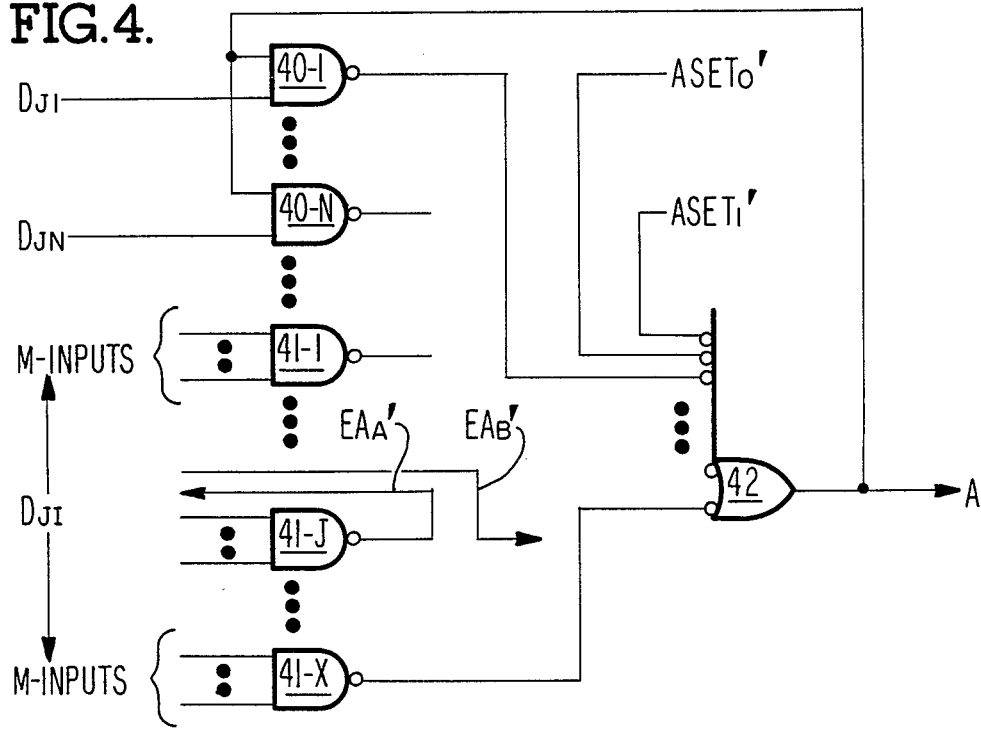
Figure 7:
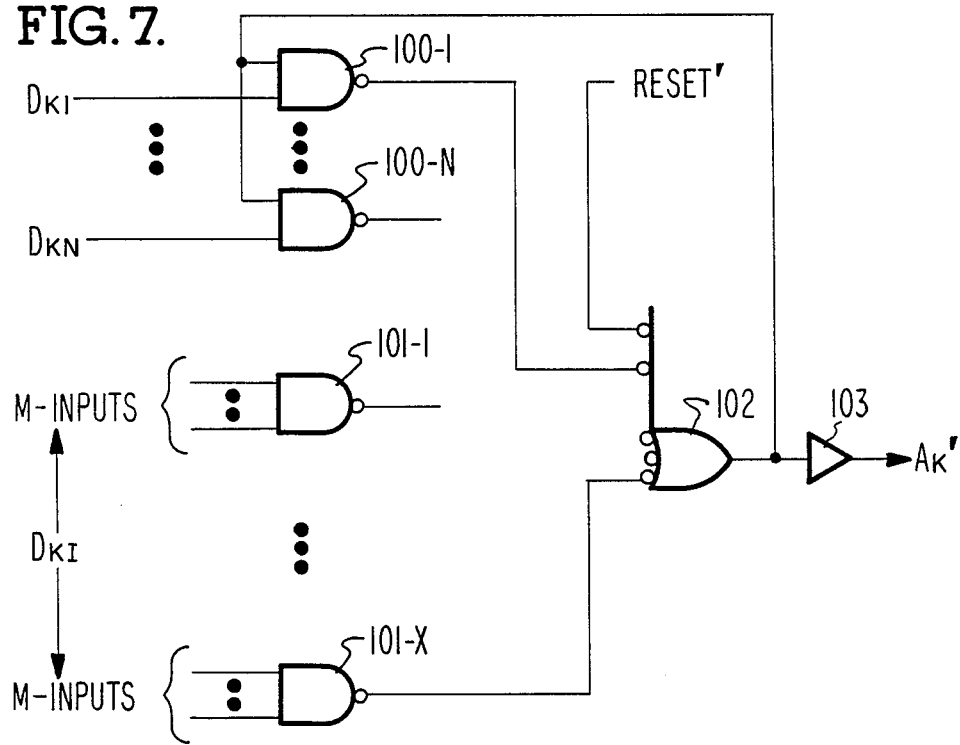
Figure 5:
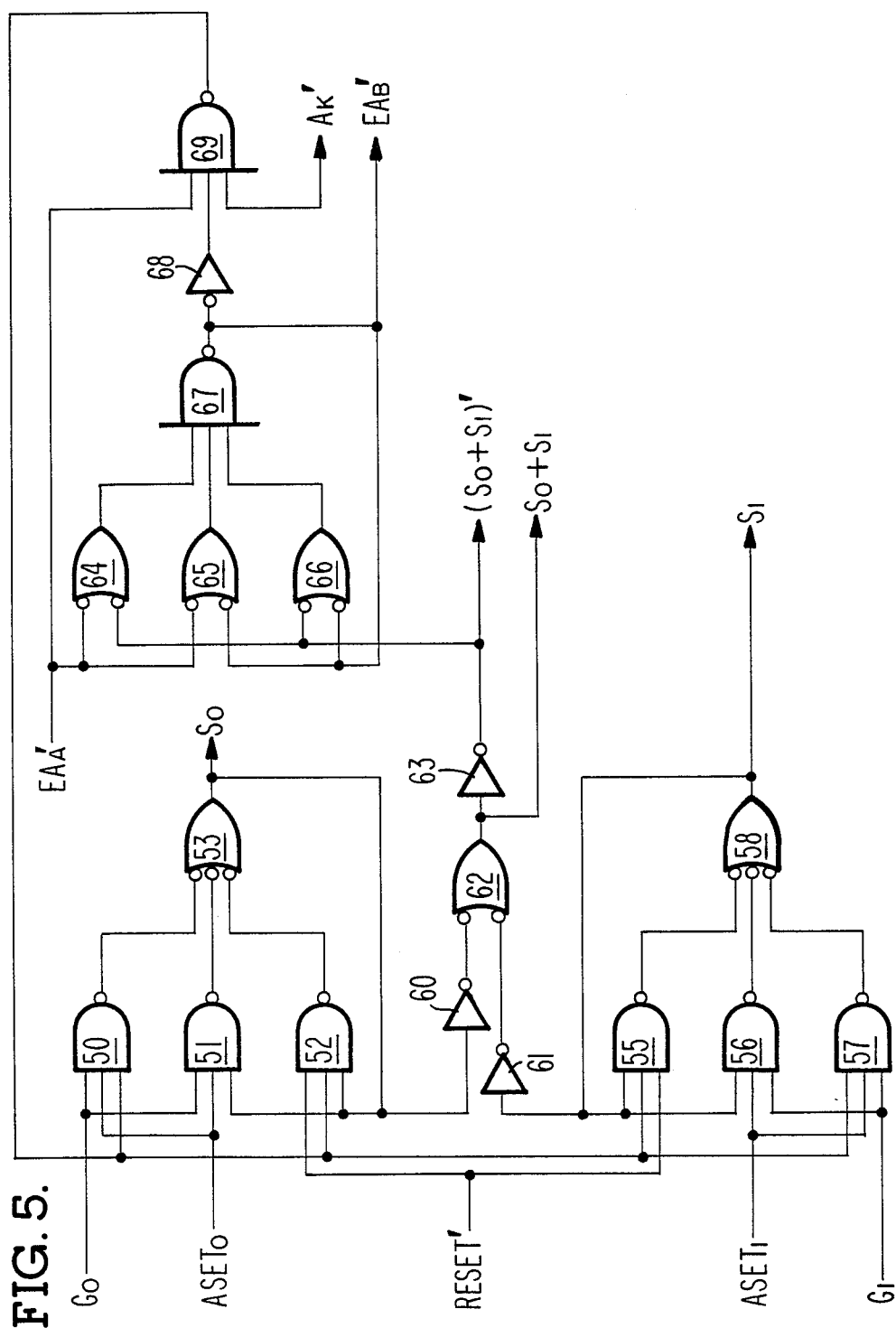
Figure 6:
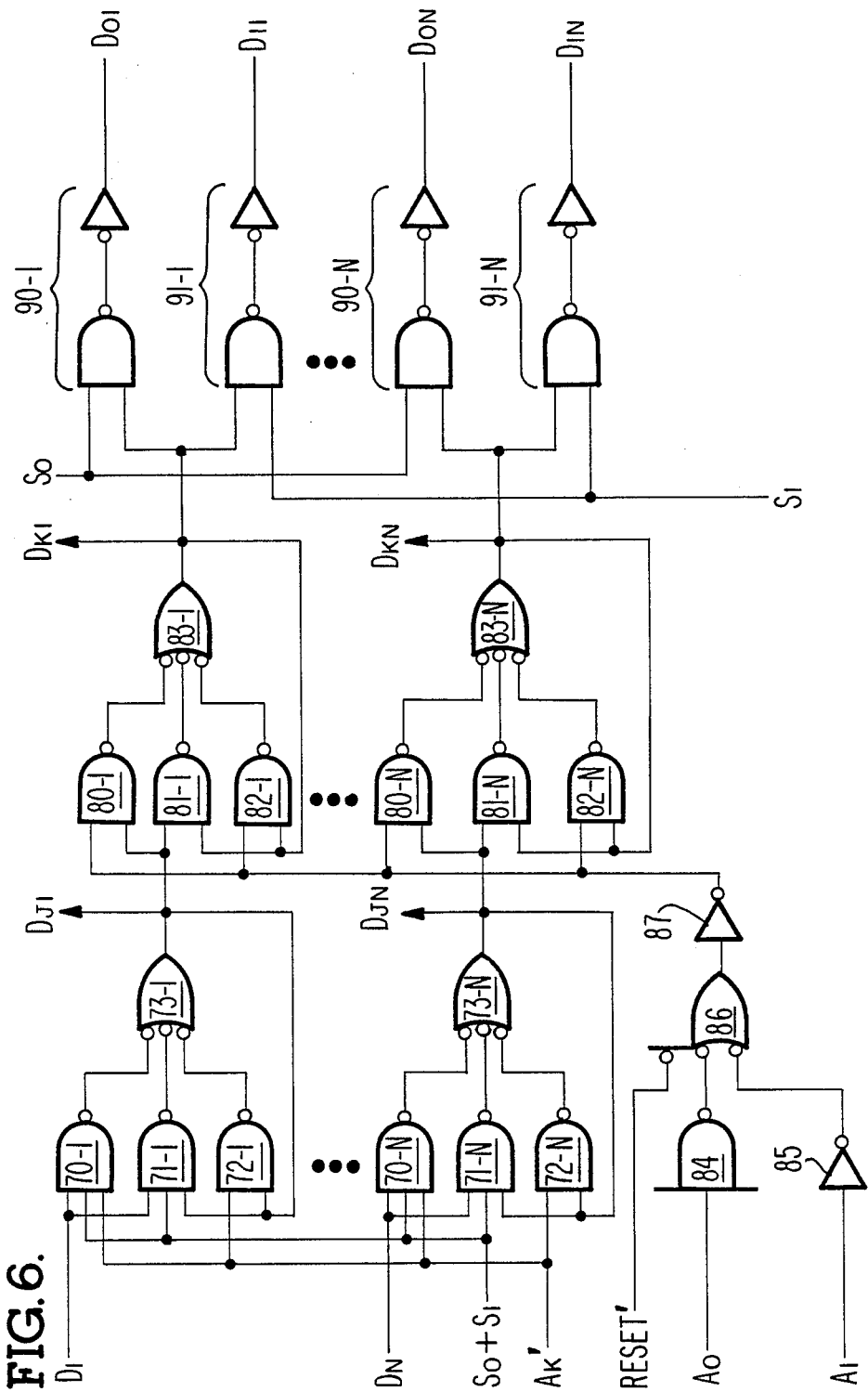

Detailed logic diagrams for a preferred embodiment of the selector of FIG. 2 are given in FIGS. 3 through 7, and the operation of these logic circuits will now be described. In general, FIGS. 3 and 5 illustrate that portion of the selector which selects one of the output ports; whereas FIGS. 4, 6 and 7 illustrate that portion of the selector which passes characters from the input port to the selected output port.

Figure 3:
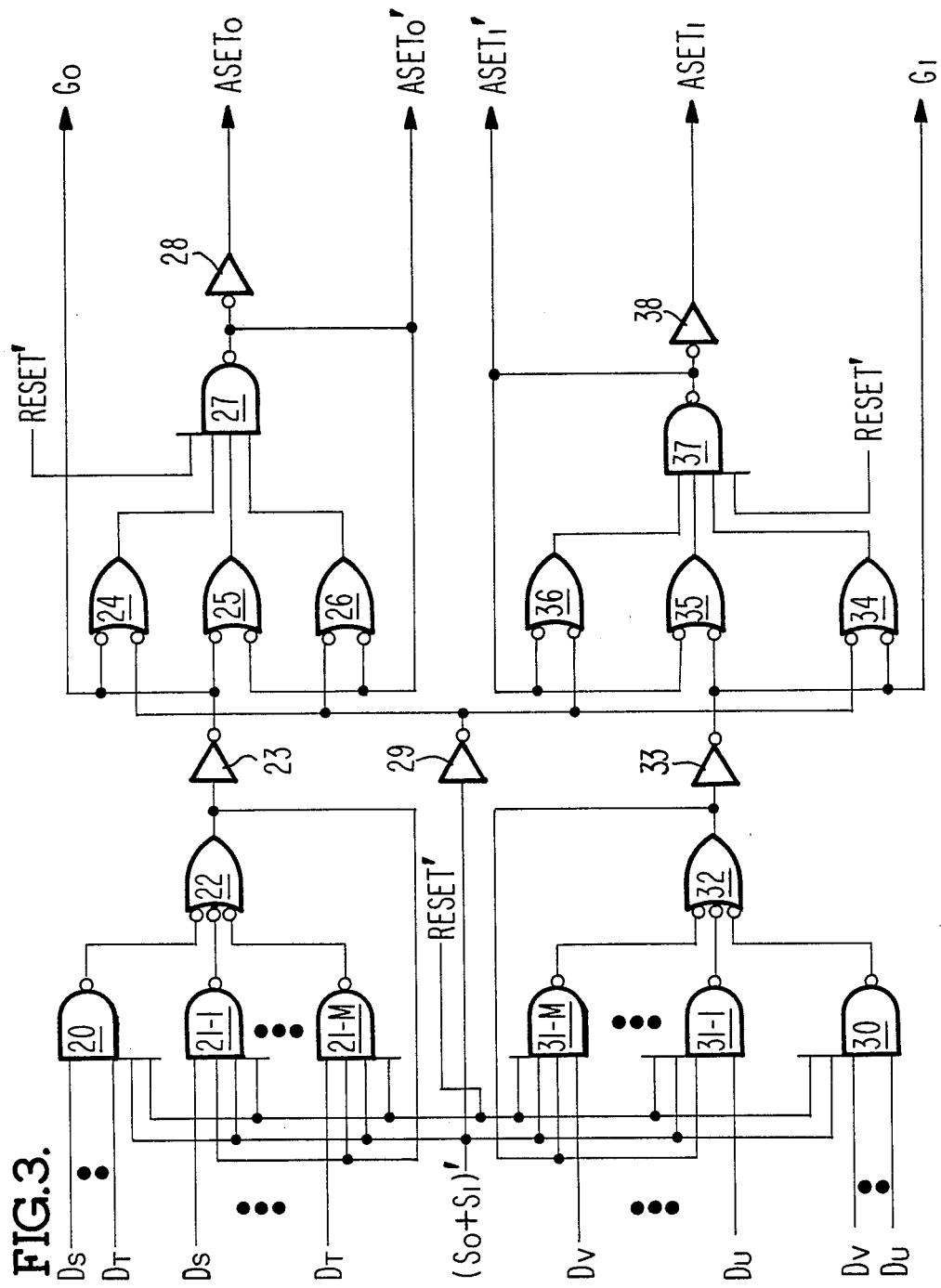
FIGS. 3 through 7 are detailed logic diagrams of one preferred embodiment of the selector of FIG. 2.

Consider first the structural details and operation of the logic circuit of FIG. 3. That circuit consists of logic gates 20 through 29 and logic gates 30 through 38, all of which are interconnected as illustrated. In general, logic gates 20 through 28 operate to select output port 12; whereas logic gates 30 through 38 operate to select output port 13.

Prior to the selection process, at power-on time, the FIG. 3 circuit is put into an initial state in response to RESET' being low. In this initial stage, signal $(S_0+S_1)'$ is high; the output of NAND gate 22 is low; and the output of NAND gate 27 is high. Thereafter, signal RESET' goes high, thereby enabling NAND gates 20 and 30 to detect the presence of one of the two control characters $A_S$ on input port 11.

That is, in FIG. 3, signals $D_S \ldots D_T$ represent M of the input data signals $D_1 \ldots D_N$ on input port 11. And those particular input data signals form the character $A_S$ which selects output port 12. Similarly, signals $D_V \ldots D_U$ are M other input data signals $D_1 \ldots D_N$ on input port 11. And those M signals form the character $A_S$ which selects output port 13.

Suppose, for example, that all of the input data signals $D_S \ldots D_T$ go to their active state, which is high. In that case, the output of NAND gate 20 goes low, which in turn forces the output of NAND gate 22 high. NAND gate 22 has its output fed back to the input of NAND gates 21-1 through 21-M; and thus the high output of NAND gate 22 is latched.

That high from NAND gate 22 forces the output of NAND gate 23 low; and in turn, that low forces the output of NAND gate 25 high. NAND gates 24 and 26 already have high outputs due to signal $(S_0+S_1)'$ being high; and thus the output of NAND gate 27 is forced low. That low from gate 27 is then latched by NAND gates 25 and 26 and forces the output of NAND gate 28 high.

In response to the output of NAND gate 27 being low, selector 10 generates a high on the input control line for input port 11. That is, signal A on input port 11 is forced high. To see how that occurs, reference should now be made to the logic circuit of FIG. 4.

By inspection, it can be seen that the FIG. 4 logic circuit consists of NAND gates 40-1 through 40-N, 41-1 through 41-X, and 42. With this notation, N is the number of input data lines and X is the number of combinations of M things taking N at a time. These NAND gates are interconnected as illustrated.

NAND gates 40-1 through 40-N and 41-1 through 41-X receive signals $D_{J1}$ through $D_{JN}$ on their inputs. These signals are generated by an input buffer in a queue of FIG. 6. But that queue is prevented, as will be described shortly, from receiving the first control character $A_S$ that is applied to input port 11. Accordingly, all of the signals $D_{J1}$ through $_{JN}$ are low; and thus signal $ASET_0'$ is sent directly to NAND gate 42 to force input control signal A high.

To understood how control character $A_S$ is prevented from entering the input buffer, consider now the control circuit of FIG. 5. It consists of logic gates 50-53, 55-58, and 60-69 all of which are interconnected as illustrated. That circuit is forced into its initial state by low signal RESET'. And in its initial state, the output of NAND gates 53 and 58 are both low and the output of NAND gates 67 and 69 are both high.

Now as described above, when control character $A_S$ is detected by the circuit of FIG. 3, signal $G_0$ goes low and three gate delays later signal $ASET_0$ goes high. And since signal $G_0$ goes low before signal $ASET_0$ goes high, the output of NAND gate 50 stays high. Thus, signal $S_0$ from NAND gate 53 stays low; and therefore signal $S_0+S_1$ from NAND gate 62 stays low. Then as can be seen by inspection of FIG. 6, the input buffer stays clear since signal $S_0+S_1$ must be high in order for the signals $D_1$ through $D_N$ on the input port to enter the queue.

Next, in response to input control signal A being high, all of the data input signals $D_1$ through $D_N$ on the input port go low. Thus in the FIG. 3 circuit, the output of all of the NAND gates 20 and 21-1 through 21-M are forced high. Accordingly, the output of NAND gate 22 goes low; and the output of NAND gate 23 goes high.

That high from gate 23 is then sent as signal $G_0$ to the input of gate 50 in FIG. 5. Thus the output of NAND gate 50 goes low; and the output of NAND gage 53 goes high. That high from NAND gate 53 is sent as signal $S_0$ to the queue of FIG. 6 to enable output port 12. And further, the high signal $S_0$ forces the output of NAND gate 62 high which in turn is sent to the queue of FIG. 6 to enable the input buffer.

A high signal $S_0+S_1$ from NAND gate 62 also causes input port control signal A to go low. This occurs since a high from NAND gate 62 forces the output of NAND gate 63 low; then that low is sent as signal $(S_0+S_1)'$ to NAND gate 29 in FIG. 3; there the output of NAND gate 29 goes high; and that forces the output of NAND gate 24 low, which in turn forces the output of NAND gate 27 high. And a high from gate 27 is then sent as signal $ASET_0'$ to the input of NAND gate 42 in FIG. 4 which causes the input port control signal A to go low.

Note that a high from NAND gate 27 in FIG. 3 also causes the output of NAND gate 28 to go low. And that low is sent as signal $ASET_0$ to NAND gates 50 and 51 in FIG. 5. But signal $S_0$ from the FIG. 5 circuit stays high because it is latched by NAND gate 52. Thus, the output port 12 of FIG. 6 stays selected, and data continues to be enabled to pass into the queue's input buffer.

Each character that is received on input port 11 following the first character is passed through the queue of FIG. 6 to the selected output port as follows. To begin, M out of N of the input data signals $D_1$ through $D_N$ in FIG. 6 go high, thereby indicating the presence of a new character on the input data lines. As these input data signals go high, they are latched in respective latches of the input buffer. In FIG. 6, reference numerals 70-1 through 73-1 indicate the input buffer latch which stores input data signal $D_1$; and reference numerals 70-N through 73-N indicate the input buffer latch which stores data input signal $D_N$.

After M of the input data signals have been stored in the input data buffer, the circuit of FIG. 4 operates to force input control signal A high. That high indicates that the character has been stored in the input buffer and can be removed from the input port 11. This high signal A is generated by one of the gates 41-1 through 41-X which detects the presence of the character in the input buffer.

That is, each of the gates 41-1 through 41-X have M inputs from the input buffer; and those M inputs are arranged to detect all of the characters that are possible. Gate 41-1 detects one character, gate 41-2 detects another character, etc. And when any of those gates detects a character in the input buffer, the output of that gate goes low thereby forcing the output of NAND gate 42 high, which in turn is latched by the feedback provided by NAND gates 40-1 through 40-N.

Data in the input buffer is thereafter transferred to the selected output port in the following manner. First, the data is passed from the input buffer to the output buffer. That output buffer consists of N latches, the first of which is indicated in FIG. 6 by reference numerals 80-1 through 83-1, and the last of which is indicated by reference numerals 80-N through 83-N. This output buffer is loaded under the direction of a control circuit consisting of NAND gates 84 through 87 whenever output port control signals $A_0$ and $A_1$ are both low and signal RESET' is high.

From the output buffer, data is passed in response to signals $S_0$ and $S_1$ to the selected output port. Signal $S_0$ enables NAND gate pairs 90-1 through 90-N, whereas signal $S_1$ enables NAND gate pairs 91-1 through 91-N. Signals from the output buffer are also sent to the control circuit of FIG. 7 which, in general, operates to provide a feedback from the output buffer to the input buffer.

That feedback is in the form of a signal $A_K'$ which enables the input buffer to be cleared when it is low and enables the input buffer to be set when it is high. By inspection of FIG. 7, it can be seen that that circuit consists of NAND gates 100-1 through 100-N, 101-1 through 101-X, 102 and 103. Again in this notation, X represents the number of combinations of M things taking N at a time. Also, each of the NAND gates 101-1 through 101-X has M inputs from the output buffer; and those inputs are arranged to detect any character in the output buffer.

Accordingly, when a character is present in the output buffer, the output of one of the NAND gates 101-1 through 101-X goes low; and thus the output of NAND gate 102 goes high. This high is latched by the feedback provided by NAND gates 100-1 through 100-N. Also, this high forces signal $A_K'$ to a low; which in turn enables the input buffer to be cleared.

Note, however, that the input buffer does not clear until signals $D_1$ through $D_N$ on the input port go low in response to input port control signal A being high. When that occurs, signals $D_{J1}$ through $D_{JN}$ in the input buffer go low. Those signals are monitored by the control circuit of FIG. 4; and when they all go low, all of the outputs of NAND gates 40-1 through 40-N and 41-1 through 41-X are high. That in turn forces input port control signal A to a low, which indicates that a new character can be presented to the input port.

But a new character on the input port will not be accepted by the input buffer of FIG. 6 until data in the output buffer is taken from the selected output port. That occurrence is signified by output port control signal $A_0$ going high. When that occurs, the output of NAND gate 87 in FIG. 6 goes low which in turn clears the output buffer when the input buffer has been cleared. Then the output of all of the NAND gates 100-1 through 100-N and 101-1 through 101-X in the feedback circuit of FIG. 7 go high which in turn forces signal $A_K'$ to a high. And when signal $A_K'$ is high, a new character can be received by the input buffer, whereupon all of the above signal sequencing will be repeated.

Consider now the action of the selector when control character $C_{EA}$ is received on input port 11. That control character indicates to the selector that the message on its input port is complete, and thus the previously selected output port should be deselected. In detail now, that deselection occurs as follows.

To begin, M of the signals $D_1$ through $D_N$ on the input buffer of FIG. 6 go high; and those signals are latched in the input buffer. From there, they are sent to the control circuit of FIG. 4 where NAND gate 41-J detects the presence of character $C_{EA}$. That detection is indicated by the output of NAND gate 41-J going low.

That low is transferred as signal $EA_A'$ to the control circuit of FIG. 5. There, signal $EA_A'$ being low forces the output of NAND gate 65 high, which in turn forces the output of NAND gate 67 low. That low is then latched by NAND gates 66 and 65; and it is also sent back to the input of NAND gate 42 in FIG. 4 as signal $EA_B'$. There, signal $EA_B'$ being low forces input port control signal A to a high thereby indicating that control character $C_{EA}$ can be removed from the input port.

A low signal $EA_B'$ also forces the output of NAND gate 68 high in FIG. 5. But that high does not cause the output of NAND gate 69 to go low because it is blocked by signal $EA_A'$ being low. Accordingly, the output of gate 69 stays high and no further signal transitions take place in the FIG. 5 circuit. In particular, signal $S_0$ stays high and so that output port 12 stays selected.

Thereafter, control character $C_{EA}$ in the input buffer of FIG. 6 is transferred to the output buffer. And from there, it is transferred to the selected output port 12. Then, one of the gates 101-1 through 101-X in the FIG. 7 circuit detects the presence of control character $C_{EA}$ in the output buffer; and that in turn causes feedback signal $A_K'$ to go low. A low signal $A_K'$ enables the input buffer of FIG. 6 to be reset; but it also is sent to NAND gate 69 in FIG. 5 to hold the output of that gate high even after the input buffer is reset.

Now when control character $C_{EA}$ is removed from input port 11 in response to input port control signal A being high, the input buffer resets. That is, all of the signals $D_{J1}$ through $D_{JN}$ go low. In response thereto, the output of all of the NAND gates 40-1 through 40-N and 41-J of FIG. 4 go high.

Also, the above clearing of the input buffer forces signal $EA_A'$ in FIG. 5 to a high. But again, the output of NAND gate 69 is held by the low signal $A_K'$. Signal $A_K'$ stays low until data is taken from the selected output port 12. When output port control signal $A_0$ goes high, the output of NAND gate 87 in FIG. 6 goes low; the output buffer clears; so then signal $A_K'$ from the FIG. 7 circuit goes high. And then the output of NAND gate 69 in FIG. 5 goes low, which in turn forces $S_0$ from NAND gate 53 low thereby deselecting the previously selected output port 12.

Signal $S_0$ going low forces NAND gate 62 to go low blocking inputs to the input buffer by signal $S_0+S_1$. The low on NAND gate 62 forces NAND gate 63 high. NAND gate 64 changes to low causing NAND gate 67 to change to high with signal $EA_B'$ latched into NAND gates 65 and 66. $EA_B'$ changing high causes NAND gate 42 of FIG. 4 to change low. Input port 11 is then back to its initial state.

All of the details of one preferred embodiment of the invention have now been described. But in addition, however, many changes and modifications can be made to these details without departing from the nature and spirit of the invention. Accordingly it is to be understood that the invention is not limited to said details but is defined by the appended claims.

What is claimed is:

1. A selector comprised of:
   one input port and two output ports, said input port having N input data lines and each of said output ports having N output data lines;
   means for selecting only one of said two output ports at a time;
   means for passing characters from said input port to said selected output port;
   each of said characters being represented by active logic signals that asynchronously occur with respect to each other on M-out-of-N data lines of said input port, with M being at least two and N being greater than M and greater than three; and
   said means for passing including means for detecting when M of said active logic signals are present on said N data lines of said input port and for initiating their passage to said output port in response thereto.

2. A selector according to claim 1 wherein said means for selecting selects an output port when neither output port is already selected in response to the presence of either one of two predetermined characters being on said input port indicating which output port is to be selected.

3. A selector according to claim 2 and further including means for inhibiting that character which selects said output port from passing to said selected output port.

4. A selector according to claim 1 wherein said means for passing includes an N-bit wide queue means for asynchronously receiving the active logic signals of said characters from said input port and for transmitting all of said logic signals of each received character to said selected output port in parallel and in synchronization with each other.

5. A selector according to claim 1 wherein said input port further includes one input control line, and wherein said means for passing includes means for generating control signals on said one input control line indicating when characters on said N input data lines are accepted and can change.

6. A selector according to claim 1 wherein each of said output ports further includes one output control line, and wherein said means for passing includes means for removing one character from said N output data lines of said selected output port and generating another character thereon in response to externally generated signals on said output control line of said selected output port.

7. A selector according to claim 1 and further including means for detecting a predetermined character on said N input data lines of said input port and in response thereto for deselecting from said selected input port.

8. A selector comprised of:
   one input port means and two output port means;
   said input port means including N input data lines for receiving sequences of externally generated characters with each character being represented by active logic signals that asynchronously occur with respect to each other on M-out-of-N of said N input data lines where M is at least two and N is greater than M and greater than three;
   each of said output port means including N output data lines; and
   means for passing all of the active logic signals of a character in parallel and in synchronization with each other from said input port means to a selectable one of said two output port means upon the occurrence of M active logic signals on said N input data lines at the same time.

9. A selector according to claim 8 and further including means for selecting an output port when neither output port is already selected in response to the presence of either one of two predetermined characters being on said input port indicating which output port is to be selected.

10. A selector according to claim 9 and further including a means for inhibiting that character which selects said output port from passing to said selected output port.

* * * * *